(12) United States Patent
Patel et al.

(10) Patent No.: US 10,436,114 B2
(45) Date of Patent: Oct. 8, 2019

(54) COMBUSTOR COOLING SYSTEM

(71) Applicant: PRATT & WHITNEY CANADA CORP., Longueuil (CA)

(72) Inventors: Bhawan B. Patel, Mississauga (CA); Oleg Morenko, Oakville (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 546 days.

(21) Appl. No.: 14/835,775

(22) Filed: Aug. 26, 2015

(65) Prior Publication Data

US 2017/0058775 A1    Mar. 2, 2017

(51) Int. Cl.
| | | |
|---|---|---|
| F23R 3/60 | (2006.01) | |
| F02C 7/18 | (2006.01) | |
| F02C 3/14 | (2006.01) | |
| F23R 3/00 | (2006.01) | |
| F23R 3/50 | (2006.01) | |
| F23R 3/04 | (2006.01) | |
| F23R 3/06 | (2006.01) | |

(52) U.S. Cl.
CPC ............... *F02C 7/18* (2013.01); *F02C 3/14* (2013.01); *F23R 3/002* (2013.01); *F23R 3/04* (2013.01); *F23R 3/06* (2013.01); *F23R 3/50* (2013.01); *F05D 2240/126* (2013.01); *F05D 2260/20* (2013.01); *F23R 3/60* (2013.01); *F23R 2900/03041* (2013.01); *F23R 2900/03042* (2013.01)

(58) Field of Classification Search
CPC .... F23R 3/60; F23R 3/002; F23R 3/04; F23R 3/26; F23R 2900/03043; F23R 2900/03045; F23R 3/50; F23R 3/10; F02C 7/18
See application file for complete search history.

(56) References Cited

U.S. PATENT DOCUMENTS

| | | | | |
|---|---|---|---|---|
| 2,614,384 | A * | 10/1952 | Feilden | F23R 3/60 60/39.19 |
| 2,674,846 | A * | 4/1954 | Bloomer | F23C 7/004 60/39.23 |
| 4,487,015 | A * | 12/1984 | Slattery | F23R 3/60 60/751 |
| 4,679,400 | A * | 7/1987 | Kelm | F23R 3/60 415/137 |
| 4,852,355 | A * | 8/1989 | Kenworthy | F02C 7/18 415/115 |
| 6,058,696 | A | 5/2000 | Nikkanen et al. | |
| 6,106,229 | A | 8/2000 | Nikkanen et al. | |
| 7,861,512 | B2 | 1/2011 | Olver et al. | |
| 8,438,835 | B2 | 5/2013 | Perveiler et al. | |

(Continued)

*Primary Examiner* — William H Rodriguez
*Assistant Examiner* — Thomas P Burke
(74) *Attorney, Agent, or Firm* — Norton Rose Fulbright Canada LLP

(57) ABSTRACT

A gas turbine engine has a combustor supported in a gas generator case. A baffle apparatus is attached to the gas generator case, surrounding an upstream section of the combustor to create at least one passage for directing an air flow discharged from a compressor diffuser to pass therethrough for cooling the combustor. The at least one passage extends from an upstream end of the combustor and has a passage exit immediately upstream of a dilution hole in the combustor. The baffle apparatus is configured to increase a velocity of the air flow entering the at least one passage and passing over the combustor.

19 Claims, 4 Drawing Sheets

(56) References Cited

U.S. PATENT DOCUMENTS

| | | | |
|---|---|---|---|
| 8,516,791 B2 | 8/2013 | Perveiler et al. | |
| 2004/0036230 A1* | 2/2004 | Matsuda | F01D 9/023 |
| | | | 277/632 |
| 2006/0032235 A1* | 2/2006 | Aumont | F23R 3/007 |
| | | | 60/796 |
| 2010/0077763 A1* | 4/2010 | Alkabie | F23R 3/06 |
| | | | 60/754 |
| 2013/0291554 A1 | 11/2013 | Marini et al. | |

* cited by examiner

COMBUSTOR COOLING SYSTEM

TECHNICAL FIELD

The application relates generally to gas turbine engines and more particularly, to a combustor cooling system for such engines.

BACKGROUND OF THE ART

Gas turbine engines have a combustor wherein a combustion reaction takes place to generate high temperature combustion gases to power turbines positioned downstream of the combustor. Various techniques have been devised to maintain the temperature of the combustor walls below critical levels. For example, coolant air from the compressor of the engine is often directed to the combustor walls such as along a cord side or back side thereof which is not directly exposed to the not gases of the combustion. The compressor supplies air under pressure to the combustor for both combustion and cooling purposes. Various ways of disbursing the air for the two purposes have been proposed. In the conventional arrangement, a majority of compressor air is mixed with fuel for the combustion reaction taking place within the combustor while the remaining air supplied by the compressor is utilized to cool the combustor and other engine components. It is a challenge to meet the anticipated future NOx/CO Smoke emission regulations, particularly for small aero gas turbine engines, because high pressure combustion systems must minimize compressed air utilization for combustor wall cooling and at the same time meet the greater cooling air demands of smaller combustors.

Accordingly, there is a need for an improved combustor cooling system.

SUMMARY

In one aspect, there is provided a gas turbine engine having a gas generator section comprising: a combustor supported within a gas generator case and positioned downstream of a compressor diffuser, the combustor defining combustion chamber therein and including an upstream end of the combustor to which a fuel/air mixer is attached and a downstream end of the combustor which defines a combustion chamber exit, a baffle apparatus attached to the gas generator case and surrounding the combustor, at least one passage being thereby formed between the baffle apparatus and the combustor for directing an air flow discharged from the compressor diffuser to pass over and to cool the combustor, the at least one passage extending from upstream end of the combustor and extending over only a portion of a primary zone of the combustor, the baffle apparatus being configured to increase a velocity of the air flow flowing through the at least one passage and passing over the combustor.

In another aspect, there is provided a gas turbine engine having a gas generator section comprising an annular outer case and an annular inner case defining an annulus therebetween, an annular combustor positioned in the annulus and including first and second annular combustor wall defining an annular combustion chamber therebetween, the annular combustor including an upstream end to which a fuel/air mixer is attached and a downstream end which defines a combustion chamber exit, a baffle apparatus attached to the annular outer and inner cases, the baffle apparatus being in an annular configuration and surrounding a section of the annular combustor to thereby provide a first annular passage between the first annular combustor wall and the baffle apparatus and a second annular passage between the second annular combustor wall and the bathe apparatus for directing an air flow discharged from the compressor diffuser to pass therethrough for cooling the first and second annular combustor walls, the respective first and second annular passages extending from the upstream end of the annular combustor and having a respective passage exit immediately upstream of a dilution hole in the respective first and second annular combustor wall, the baffle apparatus being configured to increase a velocity of the air flow flowing through the respective first and second passages and passing over the section of the annular combustor.

In a further aspect there is provided a method of cooling a combustor of a gas turbine engine, the combustor being positioned downstream of a compressor diffuser and supported within a gas generator case, the method comprising a step of attaching a baffle apparatus to the gas generator case to create a passage for directing a portion of the air flow discharged from the compressor diffuser to flow over a portion of a combustor wall and discharging the portion of air flow from the passage in a location immediately upstream of a dilution hole in the combustor wall, thereby coding the portion of the combustor wall by the portion of air flow in an increased velocity.

DESCRIPTION OF THE DRAWINGS

Reference is now made to the accompanying drawings in which.

It will be noted that throughout the appended drawings, like features are identified by like reference numerals.

DETAILED DESCRIPTION

Figure 1:
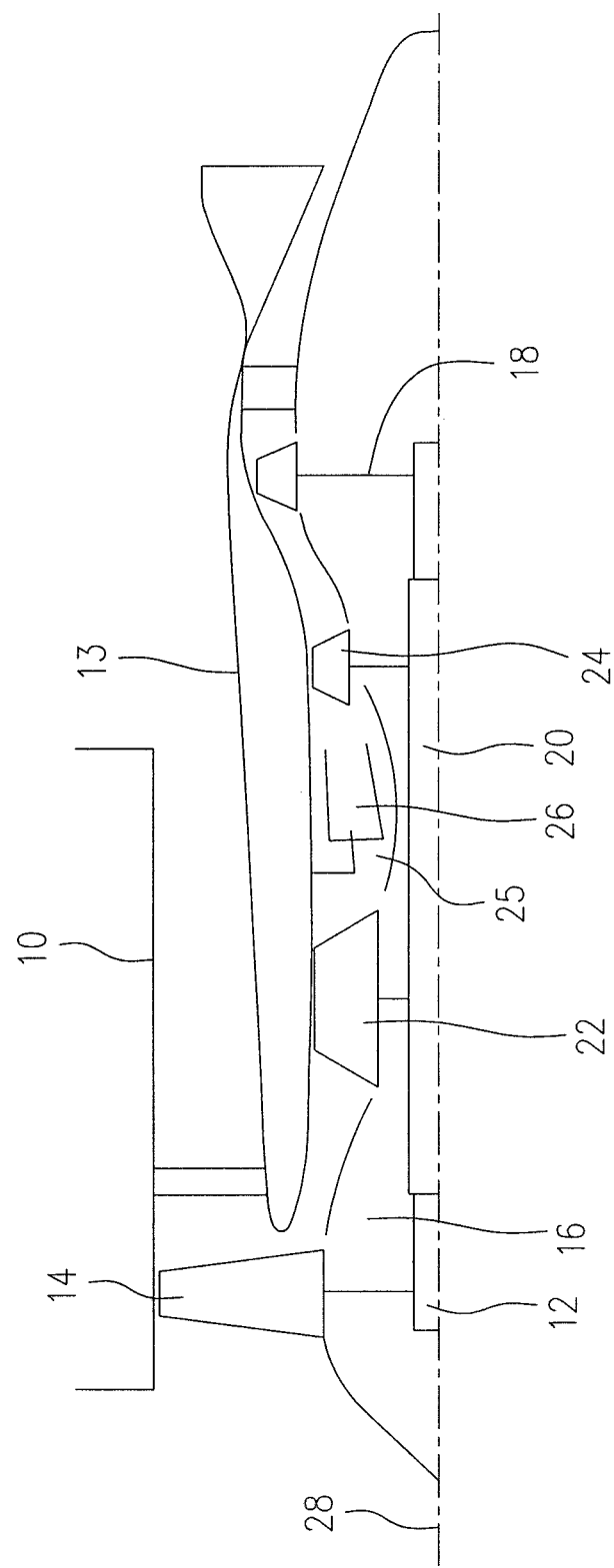
FIG. 1 is a partial schematic side cross-sectional view of a gas turbine engine as an example illustrating application of the described subject matter.

Referring to FIG. 1, a turbofan a gas turbine engine includes a fan case 10 a core casing 13, a low pressure which includes fan assembly 14, a low pressure compressor assembly 18 and a low pressure turbine assembly 18 connected by a shaft 12 and a high pressure spool assembly which includes a high pressure compressor assembly 22 and a high pressure turbine assembly 24, connected by a turbine shaft 20. The core casing 13 surrounds the low and high pressure spool assemblies to define a main fluid path therethrough. The engine includes a gas generator section 25 including a combustor 26 provided in the main fluid path to generate combustion gases to power the high pressure turbine assembly 24 and the low pressure turbine assembly 18.

The terms "axial", "radial" and "circumferential" used for various components below, are defined with respect to a main engine axis 28. The terms "upstream" and "downstream" used for various components below are defined with respect to the flow direction of air or gases flowing in and/or through the main fluid path of the engine.

Figure 2:
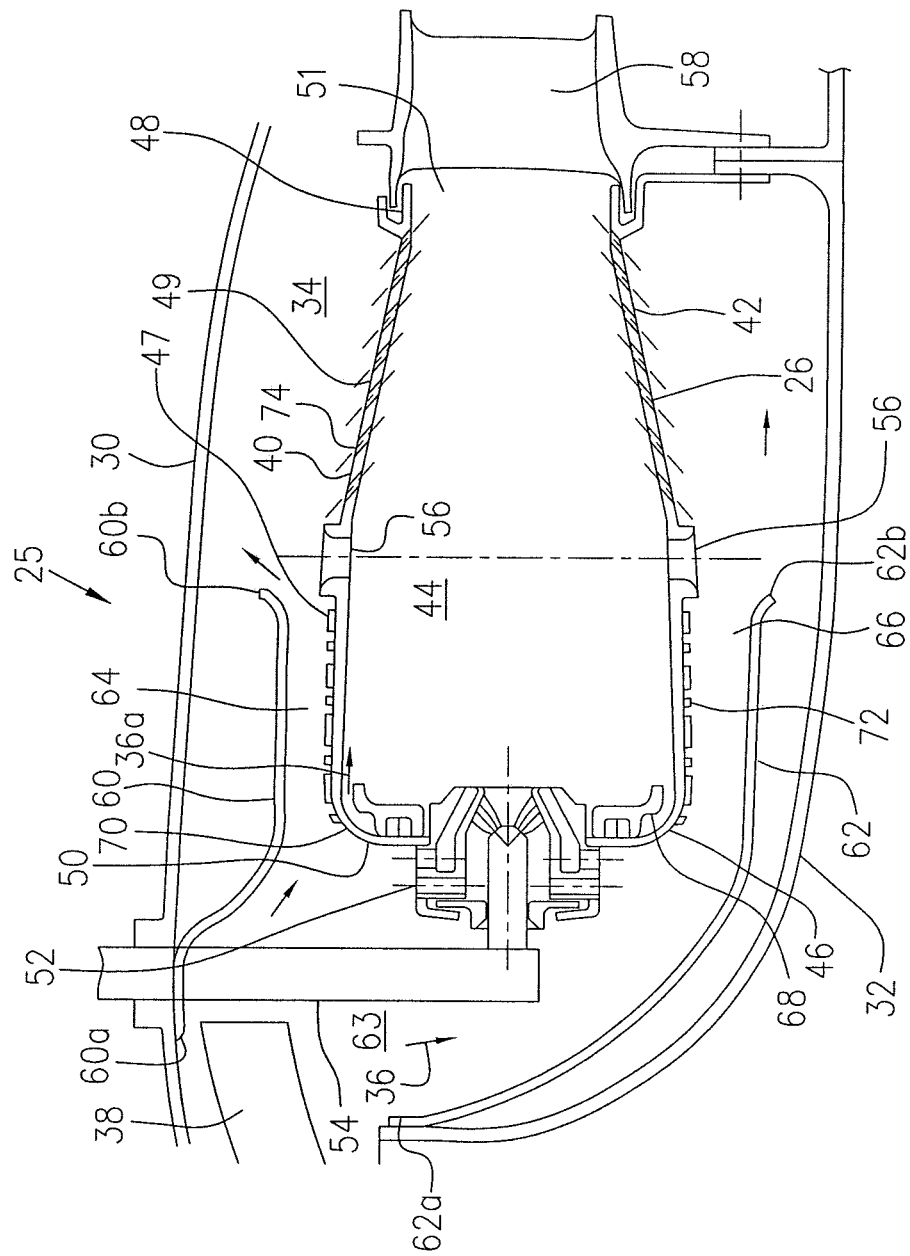
FIG. 2 is a partial cross-sectional view of a gas generator section of the gas turbine engine of FIG. 1, according to one embodiment.

Referring to FIGS. 1 and 2, the gas generator section 25 of the engine according to one embodiment may be configured with a gas generator case (which is also part of the core casing 13 of the engine) including annular outer and inner cases 30, 32 to define an annulus 34 therebetween for accommodating compressor air (indicated by arrows 36) discharged from a compressor diffuser 38. The combustor 26 may be disposed within the annulus 34 downstream of the compressor diffuser 38 and may be supported by the annular outer and inner cases 30, 32, and is thus surrounded by the compressor air 36 within the annulus 34.

The combustor 26 may include first and second annular combustor walls 40, 42 to define an annular combustion chamber 44 therebetween. The combustor 26 in this embodiment may be of an axial type in which the first and second annular combustor wall 40, 42 extend substantially axially from an upstream end 46 to a downstream end 48 of the combustor 26, or at least an upstream portion 47 of the respective first and second annular combustor was 40, 42 is axially oriented.

An annular dome wall 50 may be provided, joining the first and second annular combustor walls 40, 42 to form the upstream end 46 of the combustor 26. One or more fuel/air mixers 52 and one or more fuel nozzles 54 may be attached to the annular dome wall 50.

The fuel/air mixer 52 may have air passages for receiving compressor air 36 to be mixed with fuel injected from the fuel nozzle 54, thereby generating a swirling mixture of fuel and air to be burned in a combustion reaction taking place substantially in a primary zone of the annular combustion chamber 44. The primary zone may be defined by the upstream portions 47 of the respective first and second annular combustor walls 40, 42. A plurality of dilution holes 56 may be defined in the respective first and second combustor walls 40, 42 immediately downstream of the upstream portions 47 of the respective first and second annular combustor walls 40, 42. Compressor air 36 in the annulus 34 may enter into the combustion chamber 44 via the dilution holes 56 to precipitate completion of the combustion reaction in which some fuel which was unburned in the primary zone, will be fully burned. The completion of the combustion reaction may substantially take place in a dilution zone defined by downstream portions 49 of the first and second annular combustion walls 40, 42 which join the upstream portions 47 at, and extend from the location of the dilution holes 56 (including the location area of the dilution holes 56 and immediately downstream of the upstream portions 47) to the downstream and 48 of the annular combustor 26. The downstream end 48 of the annular combustor 26 may define a combustion chamber exit 51 to discharge combustion gases generated in the combustion chamber 44, through a high pressure turbine vane 58 into the high pressure turbine assembly 24.

A baffle apparatus according to one embodiment may be in an annular configuration, surrounding an upstream section of the annular combustor 26 which defines the primary zone of the annular combustion chamber 44 therein. The baffle apparatus may include first and second annular baffles 60, 62, each having an annular upstream baffle end 60a, 62a and an annular downstream baffle id 60b, 62b. The upstream baffle end 60a of the first annular baffle 60 may be attached to the annular outer case 30, for example in a proximity of the compressor diffuser 38, and the downstream baffle end 60b of the first annular baffle 60 may be located immediately upstream of the dilution holes 56 in the first annular combustor wall 40. The upstream baffle end 62a of the second annular baffle 62 may be attached to the annular inner case 32, for example in a proximity of the compressor diffuser 38, and the downstream baffle end 62b of the second annular baffle 62 may be located immediately upstream of the dilution holes 56 in the second annular combustor wall 42.

The first and second annular baffles 60, 62 may have respective upstream portions thereof defining an annular cavity 63 therebetween located upstream of the annular combustor 26 and being in fluid communication with the compressor diffuser 38 and with the fuel/air mixer 52. The first and second annular baffles 60, 62 may have respective downstream portions thereof spaced apart from the respective first and second annular combustor walls 40, 42.

Therefore, a first annular passage 64 may be defined between the first annular combustor wall 40 and the first annular baffle 60, and a second annular passage 66 may be defined between the second annular combustor wall 42 and the second annular baffle 62. The respective first and second annular passages 64, 66 may extend from the upstream end 46 of the annular combustor 26 and may have a respective passage exit immediately upstream of the dilution holes 56 in the respective first and second annular combustion walls 40, 42.

The annular upstream baffle ends 60a, 62a of the first and second annular baffles 60, 62 may be sealingly attached to the respective annular outer and inner cases 30, 32, such that the compressor air 36 discharged from the compressor diffuser 38 is forced to enter directly into the annular combustion chamber 44 via the fuel/air mixer 52 and to enter into the annulus 34 via the respective first and second annular passages 64, 66. Optionally, no compressor air 36 may enter a space within the annulus 34 and surrounding the annular combustor 26 without pa through the respective passages 64, 66.

The first and second annular passages 64, 66 may provide an air passage cross-section smaller than the air passage cross-section of the annular cavity 63 defined within the upstream portions of the first and second annular baffles 60, 62, thereby increasing a velocity of the compressor air 36 when the compressor air 36 enters the respective first and second annular passages 64, 66 and passes over the upstream section of the annular combustor 26 which defines the primary zone of the annular combustion chamber 44 therein, resulting in enhanced cooling performance at the upstream section of the annular combustor 26.

The downstream portion of the first annular baffle 60 may be parallel to the upstream portion 47 of the first annular combustor wall 40. The downstream portion of the second annular baffle 62 may be parallel to the upstream portion 47 of the second annular combustor wall 42. Therefore, the first and second annular passages 64, 66 may each have a substantially consistent width which may be selectively adjusted to achieve a required velocity of the air flow of the combustor air 36 passing over the cold side (back side) of the upstream portions 47 of the respective first and second annular combustor walls 40, 42.

A plurality of dome heat shields 68 may be provided to and spaced apart from an inner side of the annular dome wall 50 in order to prevent the annular dome wall 50 from being exposed directly to the combustion gases in the annular combustion chamber 44. The annular dome wall 50 may define a plurality of cooling holes 70 for introduction of the compressor air 36 boated within the annular cavity 63, into the primary zone of the annular combustion chamber 44. The compressor air 36 after entering the cooling holes 70, passes through the space between the annular dome wall 50 and the plurality of dome heat shields 68 and is then directed by the dome heat shields 68 to form a cooling air film 36a which flows along and cools a hot side (exposed directly to the combustion gases in the annular combustion chamber 44) of the upstream portions 47 of the respective annular combustor walls 40, 42.

Optionally, the upstream portions 47 of the respective annular combustor walls 40, 42 which extend from the annular dome wall 50 to a location immediately upstream of the dilution holes 56, may be free of holes extending therethrough, such as diffusion holes.

Optionally, a plurality of heat transfer augmentation elements 72 may be provided, such as fins, ridges, etc., projecting from a cold side (back side, not exposed to the combustion gases) of the respective first and second annular combustor walls 40, 42. The heat transfer augmentation elements 72 may be positioned on the cold side of the upstream portions 47 of the respective annular combustor walls 40, 42.

The portion of the compressor air 36 passing through and then being discharged from the first and second annular passages 64, 66, enters the annulus 34 with reduced velocity and recovered pressure. Some of the compressor air 36 in the annulus 34 enters the dilution zone defined within a downstream section of the annular combustor 26, through the dilution holes 56, to participate in completion of the combustion reaction taking place in the dilution zone. Optionally, a plurality of effusion holes 74 may be provided, extending through the downstream portions 49 of the respective first and second annular combustor walls 40, 42 and being inclined at an angle with respect to the respective first and second annular combustor walls 40, 42, to allow compressor air 36 to pass therethrough from within the annulus 34 and surrounding the downstream section of the annular combustor 26, to enter into the dilution zone of the annular combustion chamber 44, resulting in film cooling of a hot side of the downstream portions 49 of the respective first and second annular combustor walls 40, 42.

Figure 3:
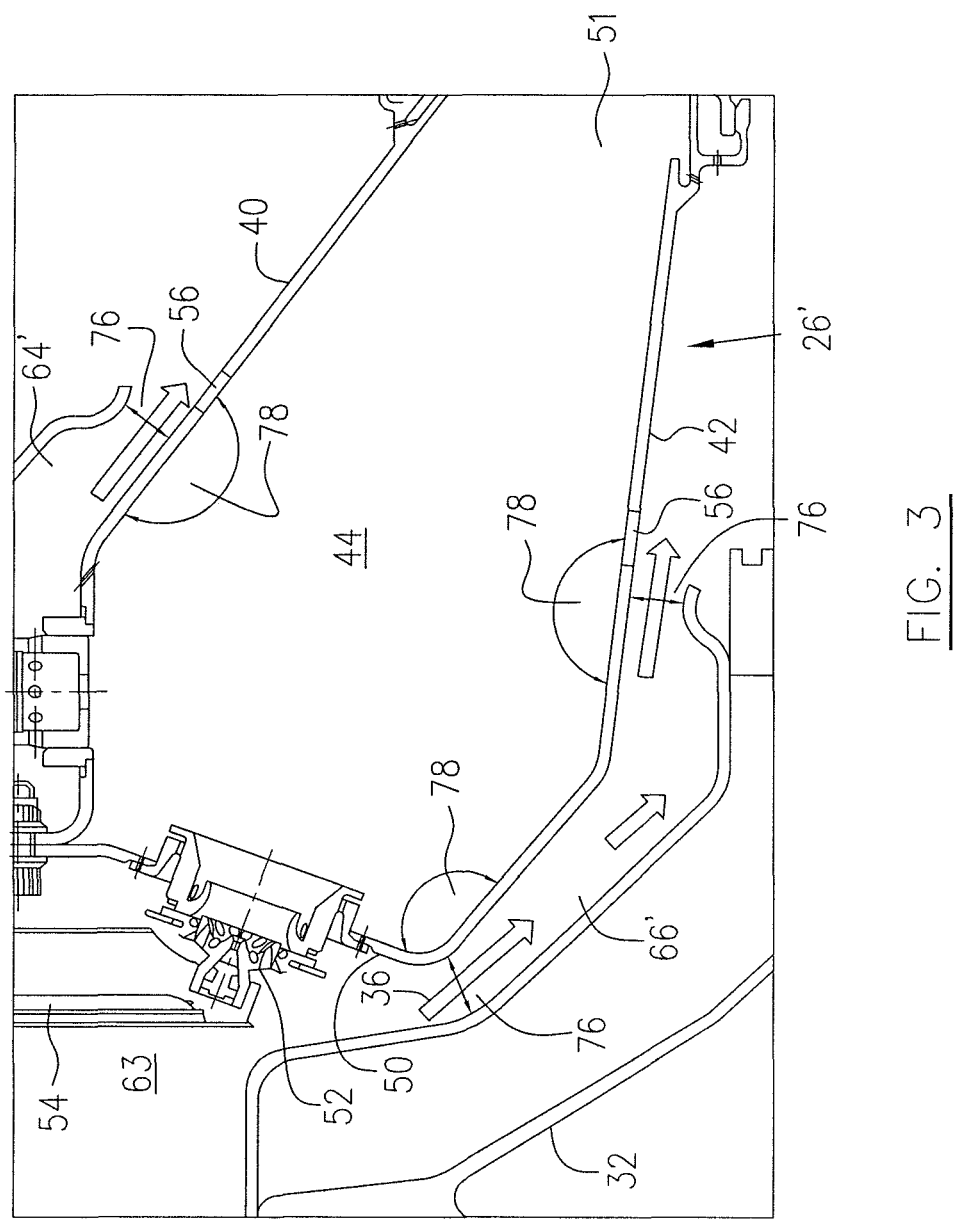
FIG. 3 is a partial side cross-sectional view of a gas generator section of the gas turbine engine of FIG. 1, according to another embodiment.

FIG. 3 illustrates another embodiment in which the annular combustor 26' is also of an annular axial type, similar to the annular combustor 26 of FIG. 2, such that at least the upstream portion of the first and second annular combustor walls 40, 42 may be radially spaced apart one from the other and may extend substantially axially. Structures and features of FIG. 3 which are similar to those shown in FIG. 2 will not be redundantly described herein. In contrast to the annular passages 64, 66 each having a substantially consistent flow passing area, as shown in FIG. 2, the first and second annular passages 64, 66 of FIG. 3, may each have a varying flow passing area to form one or more throat areas 76 which may have a minimum cross-section of the respective annular passages 64, 66, or may have a relatively reduced cross-section. The throat areas 76 may be selectively located in one or more hot spots of the respective first and second annular combustor walls 40, 42, as indicated by numeral 78. The local temperatures of the combustor walls in these hot spots are much higher than the remaining areas and more effective cooling is desirable. With such selectively positioned throat areas 76, the compressor air 36 flowing through the respective annular passages 64', 66', increases in velocity to a predetermined level when passing through the throat areas 76 of the passages, resulting in enhanced cooling performance at those particular not spots of the respective first and second annular combustor walls 40, 42. The throat areas may be provided by, for example local dimples and/or circumferential/axial wave form dimples in the respective first and second annular baffles 60, 62.

Figure 4:
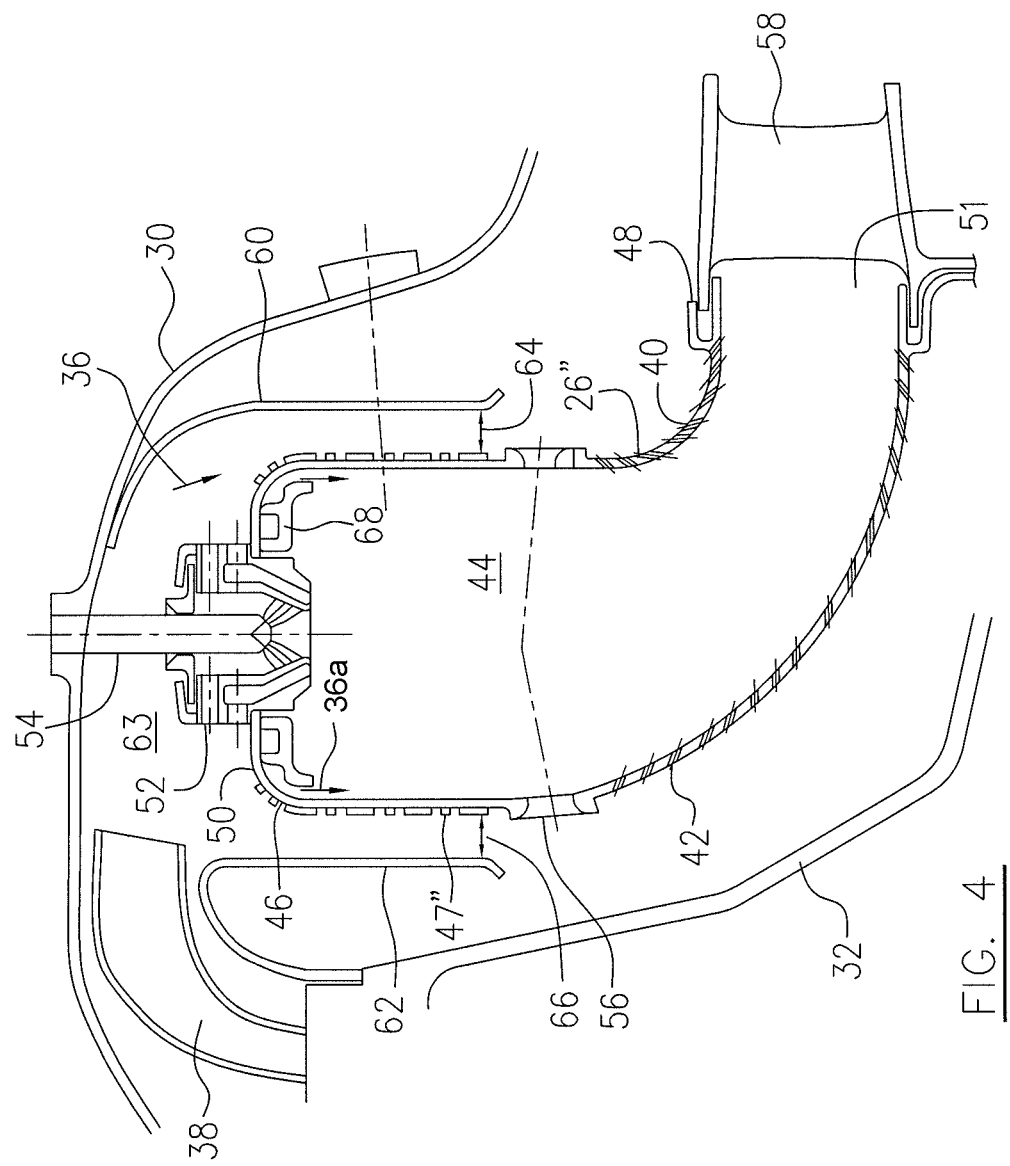
FIG. 4 is a partial side cross-sectional view of the gas turbine engine of FIG. 1, according to a further embodiment.

FIG. 4 illustrates a further embodiment in which the baffle apparatus having the first and second annular baffles 60, 62 is also applicable to an annular combustor 26" which is of an annular radial type. The upstream portion 47" of the respective first and second annular combustor walls 40, 42 of the annular radial combustor 26" may be axially spaced apart one from the other and may extend substantially radially. The other structures and features of the embodiment of FIG. 4 which are similar to those shown in FIG. 2 will not be redundantly described herein.

Some embodiments may advantageously provide a combustor cooling system which reduces the need for compressor air for cooling purposes and thereby provides more compressor air for the combustion reaction in the primary zone of the combustion chamber, to facilitate improvement in NOx/CO/smoke emissions.

The above description is meant to be exemplary only, and one skilled in the art will recognize that changes may be made to the embodiments described without departing from the scope of the described subject matter. For example, a turbofan gas turbine engine has been taken as an example to illustrate application of the described subject matter. Nevertheless, gas turbine engines of other types may also be applicable to the described subject matter. The above-described embodiments relate to a baffle apparatus used for annular combustors, however the general principle of the described baffle apparatus may also be applicable to combustors of other types such as a can combustor which has one annular combustor wall defining a combustion chamber therein. In such a case, the baffle apparatus may have an annular baffle surrounding an upstream portion of the can combustor. Still other modifications which fall within the scope of the described subject matter will be apparent to those skilled in the art, in light of a review of this disclosure, and such modifications are intended to fall within the appended claims.

The invention claimed is:

1. A gas turbine engine having a gas generator section comprising: a combustor supported within a gas generator case and positioned downstream of a compressor diffuser, the combustor defining a combustion chamber therein and including an upstream end of the combustor to which a fuel/air mixer is attached and a downstream end of the combustor which defines a combustion chamber exit, a baffle apparatus surrounding the combustor, the baffle apparatus extending from an upstream end to a downstream end, the baffle apparatus being locally attached at the upstream end to the gas generator case, the downstream end of the baffle apparatus being received in an annulus between the gas generator case and the combustor, at least one passage formed between the baffle apparatus and the combustor for directing an air flow discharged from the compressor diffuser to pass over and to cool the combustor, wherein the baffle apparatus extends to a location upstream of the upstream end of the combustor to define an annular cavity between the compressor diffuser and the combustor, the annular cavity being fluidly connected to the at least one passage, the at least one passage having an air passage cross-section smaller than an air passage cross-section of the annular cavity, the at least one passage extending from the upstream end of the combustor and extending over only a portion of a primary zone of the combustor, the baffle apparatus being configured to increase a velocity of the air flow flowing through the at least one passage and passing over the combustor.

2. The gas turbine engine as defined in claim 1 wherein the at least one passage has a substantially consistent flow passing area.

3. The gas turbine engine as defined in claim 1 wherein the at least one passage comprises a throat area defining a minimum flow passing area of the at least one passage.

4. The gas turbine engine as defined in claim 1 wherein an upstream portion of an annular combustor wall in combination with the baffle apparatus defining the at least one passage, is free of cooling holes extending therethrough.

5. The gas turbine engine as defined in claim 1 wherein the combustor has a first annular combustor wall and a second annular combustor wall, and wherein the baffle apparatus comprises a first annular baffle adjacent and spaced apart from an upstream portion of the first annular combustor wall, and a second annular baffle adjacent and spaced apart from an upstream portion of the second annular combustor wall.

6. The gas turbine engine as defined in claim 5 wherein the combustor is an annular axial combustor, the upstream portion of the first annular combustor wall and the upstream portion of the second annular combustor wall being radially spaced apart and substantially axially extending.

7. The gas turbine engine as defined in claim 5 wherein the combustor is an annular radial combustor, the upstream portion of the respective first and second annular combustor walls being axially spaced apart one from the other and substantially radially extending.

8. The gas turbine engine as defined in claim 4 wherein the upstream portion of the annular combustor wall comprises a plurality of heat transfer augmentation elements on a cold side of the annular combustor wall.

9. An aircraft engine having a gas generator section comprising an annular outer case and an annular inner case defining an annulus therebetween, an annular combustor positioned in the annulus downstream of a compressor diffuser and including a first annular combustor wall and a second annular combustor wall defining an annular combustion chamber therebetween, the annular combustor including an upstream end to which a fuel/air mixer is attached and a downstream end which defines a combustion chamber exit, a baffle apparatus having an annular configuration and surrounding a section of the annular combustor to thereby provide a first annular passage between the first annular combustor wall and the baffle apparatus and a second annular passage between the second annular combustor wall and the baffle apparatus for directing an air flow discharged from the compressor diffuser to pass therethrough for cooling the first annular combustor wall and the second annular combustor wall, the first annular passage and the second annular passage extending from the upstream end of the annular combustor and having a respective passage exit immediately upstream of a dilution hole in respective ones of the first annular combustor wall and the second annular combustor wall, the baffle apparatus being configured to increase a velocity of the air flow flowing through the first annular passage and the second annular passage and passing over the section of the annular combustor, wherein the baffle apparatus comprises a first annular baffle and a second annular baffle each having an annular upstream baffle end and an annular downstream baffle end, wherein the first annular baffle and the second annular baffle are locally attached at the respective annular upstream baffle ends to the annular outer case and the annular inner case, respectively, wherein respective annular downstream baffle ends of the first annular baffle and of the second annular baffle are received in respective annular spaces between the annular combustor and the annular outer case and the annular inner case, respectively, and wherein the first annular baffle and the second annular baffle extend to a location upstream of the upstream end of the annular combustor to define an annular cavity between the compressor diffuser and the annular combustor, the annular cavity being fluidly connected to the first annular passage and the second annular passage, the first annular passage and the second annular passage having respectively a first air passage cross-section and a second air passage cross-section, the first air passage cross-section and the second air passage cross-section being smaller than an air passage cross-section of the annular cavity.

10. The aircraft engine as defined in claim 9 wherein the downstream baffle ends of the first annular baffle and of the second annular baffle are located immediately upstream of the dilution hole in the respective first annular combustor wall and the second annular combustor wall.

11. The aircraft engine as defined in claim 9 wherein the upstream end of the annular combustor comprises an annular dome wall joining the first and second annular combustor walls, an upstream portion of the respective first and second annular combustor walls defined between the annular dome wall and the dilution hole in the respective first and second annular combustor walls being free of cooling holes extending therethrough.

12. The aircraft engine as defined in claim 10 wherein the first annular baffle and the second annular baffle comprise respective downstream portions thereof spaced apart from an associated one of the first annular combustor wall and the second annular combustor wall, thereby forming the first annular passage and the second annular passage.

13. The aircraft engine as defined in claim 12 wherein the downstream portion of the first annular baffle is parallel to a upstream portion of the first annular combustor wall and wherein the downstream portion of the second annular baffle is parallel to a upstream portion of the second annular combustor wall.

14. The aircraft engine as defined in claim 10 wherein the first annular baffle and the second annular baffle are configured to respectively provide a throat area in the first annular passage and the second annular passage.

15. The aircraft engine as defined in claim 10 wherein the annular upstream baffle ends of the first annular baffle and of the second annular baffle are respectively sealingly attached to the annular outer case and the annular inner case such that air discharged from the compressor diffuser is forced to enter into the annular combustion chamber via the fuel/air mixer and into the annulus via the first annular passage and the second annular passage.

16. The aircraft engines as defined in claim 9 wherein the upstream end of the annular combustor comprises an annular dome wall joining the first and second annular combustor walls, a upstream portion of the respective first and second annular combustor walls being defined between the annular dome wall and the dilution hole in the respective first and second annular combustor walls, and including heat transfer augmentation elements on a cold side of the respective first and second annular combustor wall.

17. The aircraft engine as defined in claim 9 wherein the first annular combustor wall and the second annular combustor wall each comprise a downstream portion located downstream of the dilution hole, each downstream portion defining a plurality of effusion holes extending therethrough.

18. A method of cooling a combustor of a gas turbine engine, the combustor being positioned downstream of a compressor diffuser and supported within a gas generator case, the method comprising: attaching a baffle apparatus to the gas generator case to create a passage for directing a portion of an air flow discharged from the compressor diffuser to flow over a portion of a combustor wall and discharging the portion of air flow from the passage in a location immediately upstream of a dilution hole in the combustor wall, thereby cooling the portion of the combustor wall by the portion of air flow in an increased velocity, wherein attaching comprises locally attaching the baffle apparatus at an upstream end thereof to the gas generator case, a downstream end of the baffle apparatus being received in an annulus between the gas generator case and the combustor, and wherein the baffle apparatus extends to a location upstream of the combustor so as to define a cavity between the compressor diffuser and the combustor, the cavity fluidly connecting the compressor diffuser to the passage created by the baffle apparatus, the passage having an air passage cross-section smaller than an air passage cross-section of the cavity.

19. The method as defined in claim 18 wherein the baffle apparatus is sealingly attached at the upstream end to the gas generator case such that air discharged from the compressor diffuser is forced to the combustor via a fuel/air mixer and to enter a space between the combustor and the gas generator case via the passage.

\* \* \* \* \*